US007392531B2

(12) United States Patent
Thurston et al.

(10) Patent No.: US 7,392,531 B2
(45) Date of Patent: Jun. 24, 2008

(54) RECOMMENDATION-BASED ELECTRONIC PROGRAM GUIDES WITH USER-IMPERCEPTIBLE PREFERENCES

(75) Inventors: Nathaniel Thurston, Somerville, MA (US); Devin Hosea, Boston, MA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 619 days.

(21) Appl. No.: 10/204,842

(22) PCT Filed: Jun. 4, 2002

(86) PCT No.: PCT/US02/17441

§ 371 (c)(1),
(2), (4) Date: Aug. 23, 2002

(87) PCT Pub. No.: WO03/073255

PCT Pub. Date: Sep. 4, 2003

(65) Prior Publication Data

US 2003/0226144 A1    Dec. 4, 2003

Related U.S. Application Data

(60) Provisional application No. 60/359,929, filed on Feb. 25, 2002, provisional application No. 60/359,873, filed on Feb. 25, 2002.

(51) Int. Cl.
*H04N 5/445* (2006.01)
*H04N 7/173* (2006.01)

(52) U.S. Cl. .............................. 725/96; 725/40; 725/48; 725/119; 725/133

(58) Field of Classification Search .................... 725/38, 725/39, 46, 61, 91, 119, 133; 348/461; 707/104.1
See application file for complete search history.

(56) References Cited

U.S. PATENT DOCUMENTS 5,759,101 A * 6/1998 Von Kohorn ................. 463/40
5,790,198 A   8/1998 Roop (Continued)

FOREIGN PATENT DOCUMENTS

WO    WO 00/33224 A1    6/2000

(Continued)

*Primary Examiner*—Kieu-Oanh Bui
(74) *Attorney, Agent, or Firm*—Patterson & Sheridan, LLP

(57) ABSTRACT

A method and apparatus for enabling the operators of television broadcasting systems or other content distribution systems to effectively alter the program viewing patterns of viewers or subscribers to direct viewership traffic to selected television programs or other content. In a recommendation based EPG system, the rating or recommendation assigned to a program is increased or decreased in accordance with the desire of the operator to increase or decrease viewership or in exchange for monetary or other consideration from content providers, advertisers or others. In one aspect, a boost value is applied to alter the recommended rating/ranking of program content, including selectively in a manner which may be substantially imperceptible to viewers. In another aspect, a sponsored program is assigned a premium position in a list of programs in exchange for receipt of monetary or other consideration. In another aspect, the program may be given an ordinal boost, elevating the program by one or more positions in a rank-ordered list of recommendations. In still another aspect, premium positions in the list are auctioned, or greater consideration is collected for providing higher values of ordinal or numerical boost.

41 Claims, 5 Drawing Sheets

U.S. PATENT DOCUMENTS

| | | | |
|---|---|---|---|
| 5,973,683 A * | 10/1999 | Cragun et al. | 715/719 |
| 6,005,597 A | 12/1999 | Barrett et al. | |
| 6,020,883 A | 2/2000 | Herz et al. | |
| 6,163,316 A | 12/2000 | Killian | |
| 6,177,931 B1 | 1/2001 | Alexander et al. | |
| 6,216,265 B1 | 4/2001 | Roop et al. | |
| 6,698,020 B1 * | 2/2004 | Zigmond et al. | 725/34 |
| 6,757,691 B1 * | 6/2004 | Welsh et al. | 707/104.1 |
| 6,773,347 B1 * | 8/2004 | Marshall et al. | 463/25 |
| 2002/0120925 A1 * | 8/2002 | Logan | 725/9 |
| 2003/0028889 A1 * | 2/2003 | McCoskey et al. | 725/91 |
| 2003/0097664 A1 * | 5/2003 | Meyers et al. | 725/138 |

FOREIGN PATENT DOCUMENTS

| | | |
|---|---|---|
| WO | WO 00/49801 A1 | 8/2000 |

* cited by examiner

RECOMMENDATION-BASED ELECTRONIC PROGRAM GUIDES WITH USER-IMPERCEPTIBLE PREFERENCES

PRIORITY CLAIM

The present application claims the priority of now abandoned provisional application Ser. Nos. 60/359,929 and 60/359,873 filed on Feb. 25, 2002, respectively.

INCORPORATION BY REFERENCE

The present application for United States Patent incorporates by reference the following commonly-owned patent applications:
WO 0120481A2 {Predictive Network PCT application};
U.S. patent application Ser. No. 60/338,398 filed Dec. 7, 2001;
U.S. Patent Application entitled: "Television Program Navigation Guide" filed Dec. 5, 2001;
U.S. Patent Application entitled: "Method and System for Selective Initial Television Channel Display" filed Oct. 22, 2001;
U.S. patent application Ser. No. 09/969,911 filed Oct. 3, 2001;
U.S. Patent Application entitled: "Method and System for Parsing Purchase Information from Web Pages filed Aug. 29, 2001;
U.S. patent application Ser. No. 09/928,493 filed Aug. 13, 2001;
U.S. patent application Ser. No. 09/877,974 filed Jun. 7, 2001;
U.S. patent application Ser. No. 09/558,755 filed Apr. 21, 2001;
U.S. patent application Ser. No. 60/282,028 filed Apr. 6, 2001;
U.S. patent application Ser. No. 09/798,337 filed Mar. 2, 2001;
U.S. patent application Ser. No. 09/777,807 filed Feb. 5, 2001;
U.S. patent application Ser. No. 09/767,693 filed Jan. 23, 2001; and
U.S. patent application Ser. No. 09/766,377 filed Jan. 19, 2001.

FIELD OF THE INVENTION

The present invention relates generally to television and other content distribution systems, and in particular, relates to methods of modifying viewership traffic using electronic programming guides capable of receiving automatically determined recommendations.

BACKGROUND OF THE INVENTION

Electronic Program Guides (EPGs) are specialized graphical user interfaces (GUIs) that allow users to navigate through a multiple of programs available for viewing or reproduction. Many EPGs present one or more layered displays—often available on a dedicated television channel—to give a user an inventory of programs available for viewing or reproduction, as well as schedules and other details (e.g., channels, program length, program synopsis, etc.) about the programs. Pointing devices are often used to control and navigate within the displays, as well as to activate links to the programs of interest. EPGs are especially useful for television viewers who can receive dozens or even hundreds of television channels, as is increasingly the case for subscribers of cable and satellite television services.

Various configurations of EPGs and associated methods, systems and devices are disclosed in the following U.S. and foreign patent documents, among others, the disclosures of which are incorporated herein by reference as if set forth in their entirety here:

| | |
|---|---|
| U.S. Pat. No. 6,177,931 | Alexander et al. |
| U.S. Pat. No. 6,163,316 | Killian |
| U.S. Pat. No. 6,005,597 | Barrett et al. |
| WO 0049801A1 | Yuen et al. |
| WO 0033224A1 | Yuen |

More recently, EPG providers have begun to investigate the use of recommendation systems to enhance EPG/user interaction qualities by providing a preferred location to content determined to be of special interest to the viewer, making such content easier to find, and improving the overall user experience. Many of these prior art EPG systems continue to utilize on-screen advertisements as a method of generating additional revenue for the service provider (cable operator, system administrator or other entities).

One such arrangement, for example, involves the display of advertisements in the EPG display window, in exchange for receipt of payment or other consideration from content providers or advertisers. Onscreen advertisements, however, are relatively ineffective, and thus an inefficient source of revenue for advertisers, because in an EPG setting, the attention of the viewer is focused on deciding what to watch next, rather than on the advertisements; and because such on-screen advertisements typically require a lengthy interaction with the EPG in order to be effective. Long-duration interaction is typically unavailable, since an intrinsic purpose of EPGs is to facilitate channel selection, by minimizing interaction time with the EPG while maximizing time for viewing desired programming.

Historically, cable operators had a limited capacity of channels they could broadcast to their subscribers, and were thus able to effectively sell the relatively scarce (and thus valuable) placement in their lineup to content providers. Today, operators of cable, other terrestrial, and satellite television systems can offer hundreds of channels to their viewers, and as a result, the value of a given placement in the lineup is diminished, to the point where system operators are no longer able to sell placement in their lineups.

What is therefore desirable, but non-existent, are methods, devices and systems that would enable system operators to selectively enhance, or otherwise modify or direct, viewership of selected television shows or other content. What is also desirable are methods, devices and systems to enable system operators to derive additional revenue in exchange for such enhancement or modification of viewership. It is also desirable to provide such methods adapted for deployment in an EPG environment. Further, it is desirable to provide such methods that can operate in a manner substantially imperceptible to viewers.

SUMMARY OF THE INVENTION

In view of the aforementioned problems and deficiencies of the prior art, one aspect of the present invention provides methods and apparatus for enabling the operators of television broadcasting systems or other content distribution systems to effectively alter the viewing patterns of viewers or subscribers, and, in the aggregate, to direct viewership traffic to selected television shows or other content.

In the context of a recommendation-based EPG system, one embodiment of the invention accomplishes this aim by enabling a selected increase or decrease in the rating or recommendation assigned to a television show (or other content) in accordance with the desire of the operator to increase or decrease viewership for the show in question.

In another aspect of the invention, methods, systems and devices are provided for enabling this selective increase or decrease in a manner substantially imperceptible to viewers.

In a further aspect of the invention, the selective increase or decrease can be provided in exchange for receipt of monetary or other consideration from content providers, advertisers or others.

In one practice of the invention, the selective increase or decrease takes the form of sponsored recommendations, in which a particular show for which viewership is to be augmented or "boosted" is assigned a "premium" position in a list of recommended shows, in exchange for receipt of monetary or other consideration.

In another practice of the invention, a show can be assigned an ordinal boost, such that the show is elevated by one or more positions in an rank-ordered list of recommendations.

In yet another practice of the invention, the monetary or other consideration collected can be augmented or maximized through the process of auctioning premium positions in the list, or by collecting greater consideration for providing higher values of ordinal or numerical boost.

BRIEF DESCRIPTION OF THE DRAWING FIGURES

Features and advantages of the present invention will become apparent to those skilled in the art from the description below, with reference to the following drawing figures, in which.

Figure 4:
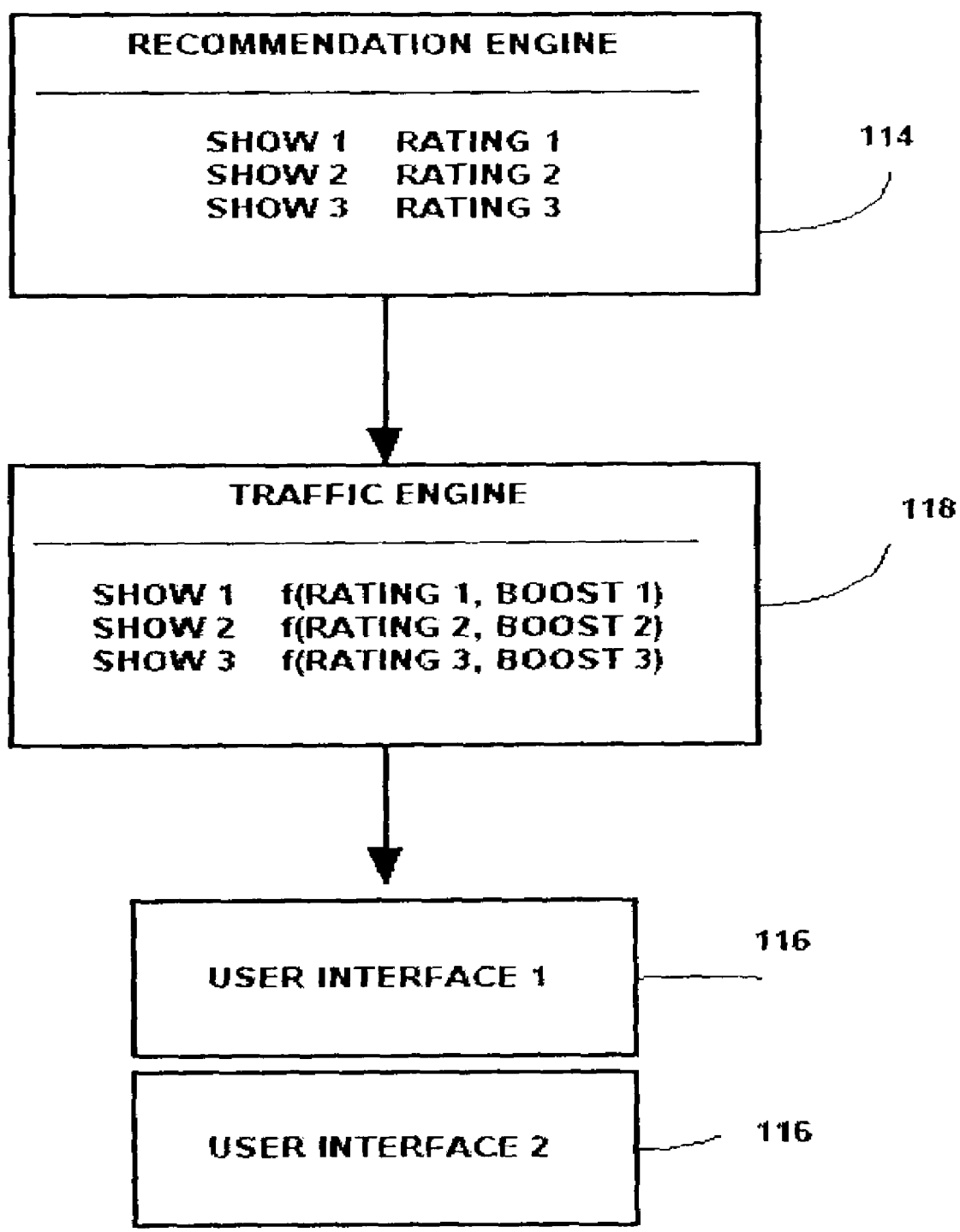
Figure 5:
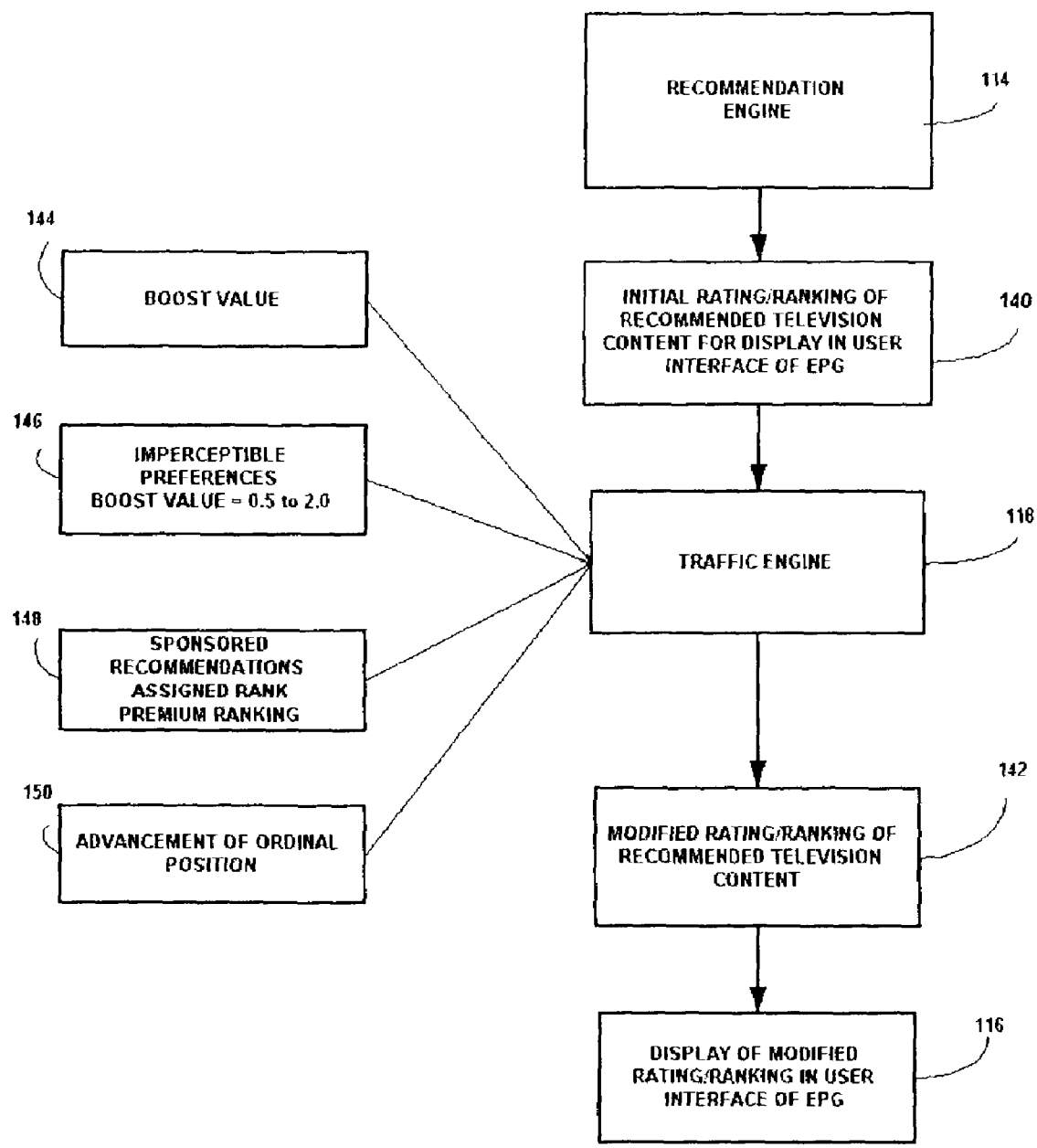

FIG. 4 a general illustration of a electronic programming guide utilizing the present invention; and FIG. 5 is an illustration that exemplifies the methods of modifying viewership as taught in the present invention.

DESCRIPTION OF PREFERRED EMBODIMENTS

Figure 1:
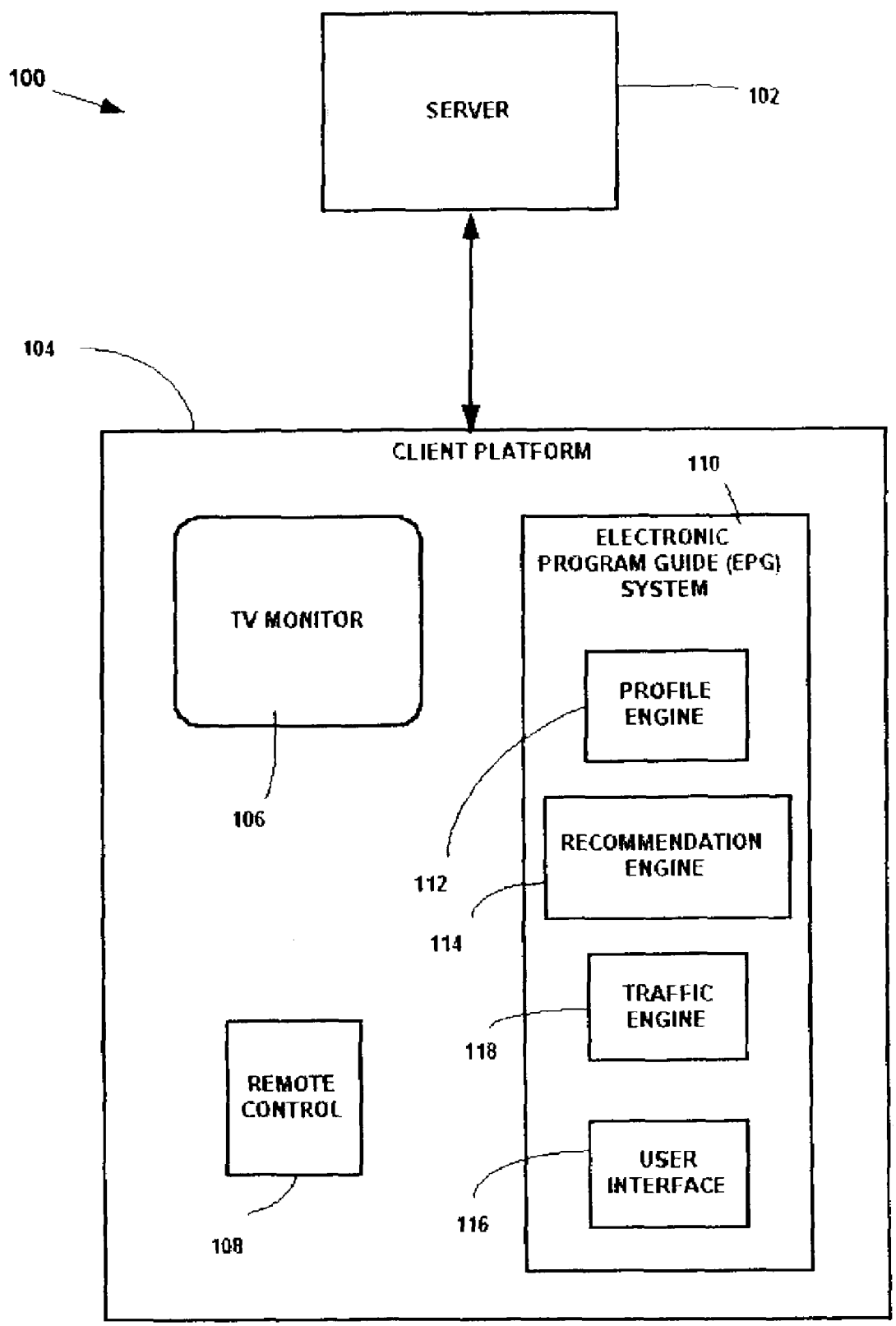
FIG. 1 is a block diagram of a content distribution system embodying the present invention.

FIG. 1 illustrates a content delivery system 100 as in the present invention. The content delivery system 100 includes a server 102 for providing program content to a client platform 104. The client platform 104 includes a television monitor 106 for viewing program content, a remote control unit 108 for selecting and controlling program content, and an electronic program guide (EPG) system 110. Within the EPG system 110, according to the present invention, there is shown a profile engine 112, a recommendation engine 114, and a user interface (UI) 116, which may include multiple layered screens. The EPG system 110 also includes a traffic engine 1118, which will be described further on.

The recommendation engine 114 is a software module that rates each television show or other content available for viewing, using known methods described in the U.S. and foreign patent documents incorporated herein by reference. In particular, the recommendation engine 114 may use profile information made available by profile engine 112 to generate the ratings or recommendations. One or more user interfaces 116 make use of these ratings to assist the viewer in finding desired programming, often by generating ordered, ranked lists of shows and giving preferred placement within such lists to shows with higher ratings. The lists are then displayed to viewers using known user methods and devices in the UI layer 116.

The structure and operation of conventional EPG and IPG systems, as well as associated television systems, Internet systems, and subscriber devices, including set-top boxes (STBs), monitors, pointing devices and other control devices, are well-known in the art. Examples are set forth in the U.S. and foreign patent documents listed above, the teachings of which are incorporated herein by reference as if set forth herein in their entirety. Many viewers rely on the ordered, ranked lists generated by such EPGs to select programs to be viewed. For example, a viewer might select an option such as "show highest ranked Sports program" for his or her next one-hour segment of viewing. EPGs thus have the potential to influence viewers' programming selections. Moreover, the ratings (and thus the rankings) assigned to shows by an EPG system can influence viewership for such shows.

Figure 2:
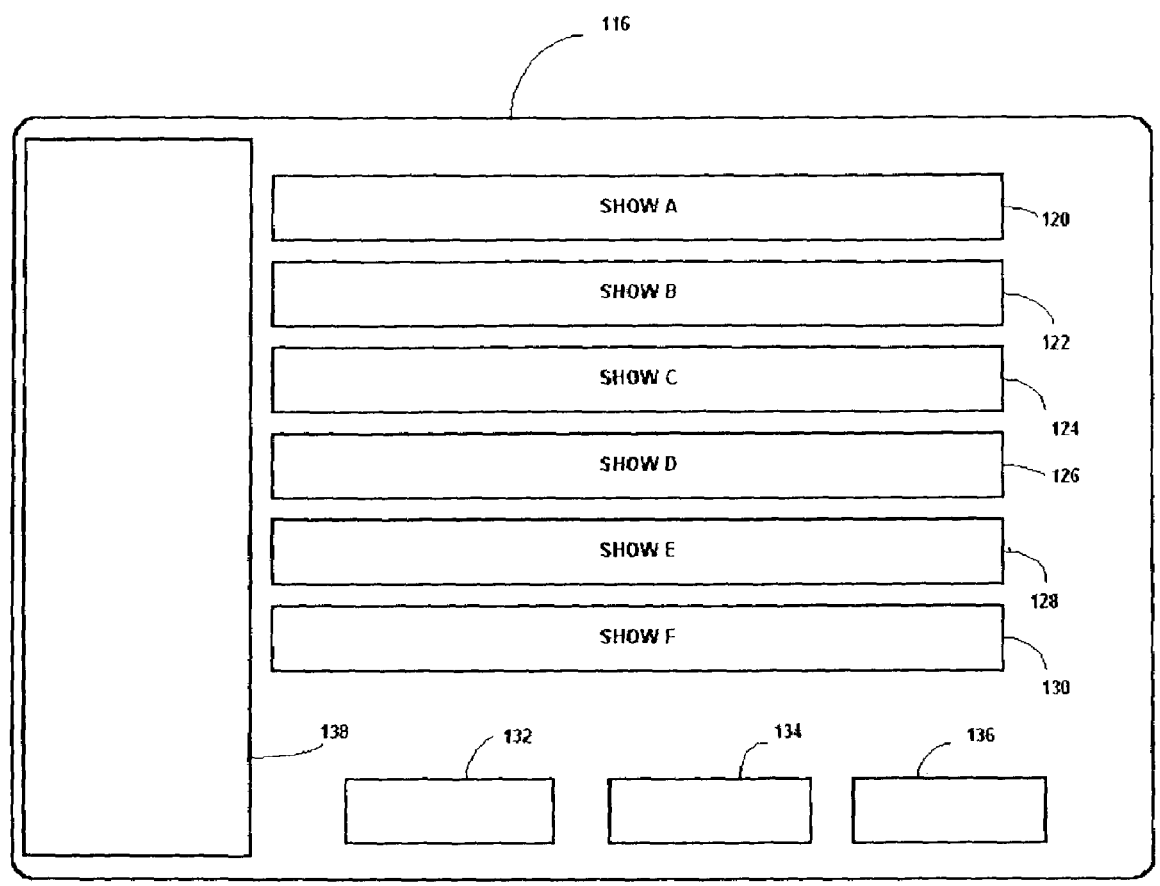
FIG. 2 is a diagram showing the layout of an exemplary user interface illustrating the principles of the present invention.

FIG. 2 illustrates a general layout of an exemplary user interface 116, as may be used in the present invention, which would be displayed on a television screen. The shows available for viewing are generally given in the form of a list of individual shows 120, 124, 126, 128, and 130. The user interface 116 also may include various other types of information, such as viewer select buttons 132, 134, 136 for use with interactive program guides (IPG's). Selection of the desired content would be made by means of the remote control unit 108. The user interface 116 may also include single or multiple informational blocks or windows. For example, the graphic display window 138 provides an area for the display of paid, sponsored advertising relating to available shows.

As described above, the listing of shows is generally presented in a ranked order, so that shows with the higher ratings are presented higher in the list. For example, in FIG. 2, the show 120, at the top of the list, has a higher ranking and rating than show 130 at the bottom of the listing. Show 120 would therefore be the more likely choice for a viewer.

The present invention advantageously exploits this potential influence, by providing methods and systems that enable selective increases (or decreases) of ratings and/or rankings of shows in an EPG.

Figure 3:
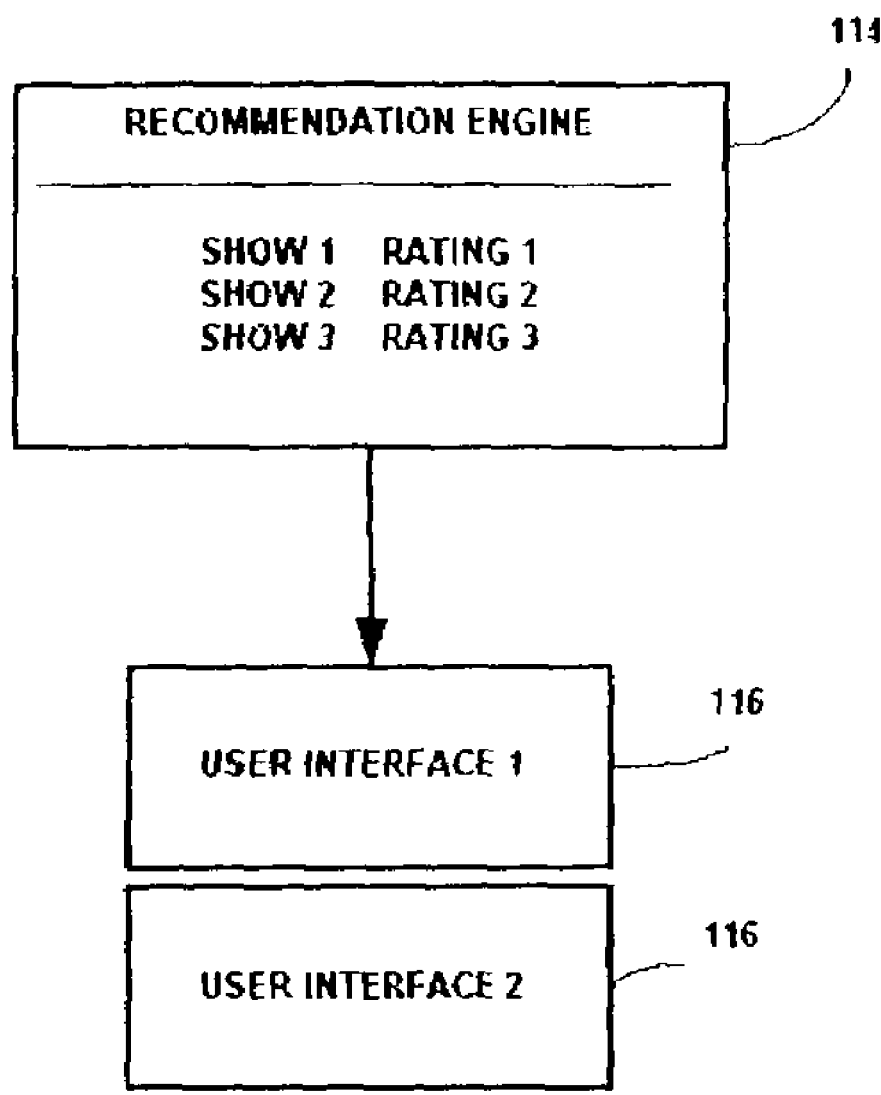
FIG. 3 illustrates a conventional recommendation-based electronic programming guide.

FIG. 3 shows the basic structure of an EPG as known in the art. Here a recommendation engine, as described above, provides viewing choices, which are ranked or rated, directly to the user interface 116 of the EPG for display and the viewer's television monitor 106.

FIG. 4 shows, by way of illustration and not limitation, an EPG system 110 utilizing the methods and systems of the present invention. The recommendation engine 114 shown therein can be substantially identical to the recommendation engine 114 of FIG. 3. In addition, the user interface 116 can be substantially similar to the user interfaces 116 shown in FIG. 3, differing primarily in that they take their ratings signals from the traffic engine 118, instead of directly from the recommendation engine 114. The traffic engine 118, is a software module that directs content and control data from the server to the user interface 116.

Traffic Engine/Boost Value: In turn, the traffic engine 118 of FIG. 4 bases its ratings on the ratings given by the recommendation engine 114, but modifies such ratings, in accordance with the present invention, based on the desires of the television system operator, as embodied by the Boost value for the show in question. Thus, as shown in the traffic engine 118 of FIG. 4, the modified rating for Show 1 is a function of Rating 1 and Boost 1. The modified rating for Show 2 (and thus its position in an ordered, ranked list of shows) is a function of Rating 2 and Boost 2; and the modified rating for Show 3 is a function of Rating 3 and Boost 3.

As illustrated in FIG. 5, it is contemplated that a modified rating of program content may be achieved by practicing several different methods as shown. In FIG. 5, the recommendation engine 114 creates an initial rating/ranking 140 of recommended television content for display in the user interface 116 of the EPG system 110. The traffic engine 118 receives modifying signals according to one or more of the several contemplated methods and creates a modified rating/ranking 142 of the recommended television content. The modified ratings/ranking are then displayed in the user interface 116 of the EPG. The contemplated methods include but are not limited to the boost value 144, described above, as well as imperceptible preferences 146, sponsored recommendations 148, and advancement of ordinal boost 150, as will next be described.

Imperceptible Preferences/Boost: In one practice of the invention, the traffic engine 118 can generate the modified ratings by multiplying the recommendation provided by the recommendation engine 114 by the boost value, such that:

$$R_{mod} = R_{re} * B.$$

In this way, only shows that were of some interest to the viewer (based on the operation of the EPG) will be recommended. If the allowable values of boost are appropriately selected (e.g., values of B typically between 0.5 and 2.0), the effect of the boost will be imperceptible to most users of the system. As a result, the illustrated system and method will enable cable television or other system operators to augment, decrease or otherwise manipulate viewership for selected shows or other content, in a manner substantially imperceptible to viewers.

Sponsored Recommendations: In another practice of the invention, the selective increase or decrease can take the form of sponsored recommendations. In a sponsored recommendation configuration, the traffic engine 118 assigns to a particular show for which viewership is to be augmented, a "premium" position in a list of recommended shows generated by the traffic engine 118. Thus, for example, the top position 120, or top two or three positions 120, 122, 124 in a list of recommended shows, as illustrated in FIG. 2, can be assigned to particular shows. In addition, the premium positions occupied by sponsored recommendations can be highlighted or otherwise visually distinguished from other positions in a list of recommendations displayed by the EPG, to further attract viewers to select the premium shows. The sponsored recommendations can also be displayed in the form of graphic advertisements, as in the graphic display window 138, shown in FIG. 2.

Advancement of Ordinal Position: In another practice of the invention, a show can be assigned an ordinal boost, such that the show is elevated by one or more positions in an ordered, ranked list of recommendations generated by traffic engine 118. For example, a particular show can be assigned an ordinal boost of 1, such that if it were otherwise ranked 5th within a list of recommended shows, it would be advanced to 4th. The show otherwise ranked 4th could be displaced or "bumped" downward by the ordinal advancement of the boosted show.

Consideration for Boost or Placement: In a further aspect of the invention, the selective increase or decrease can be provided in exchange for receipt of monetary or other consideration from content providers, advertisers or others.

Thus, for example, within the traffic engine 118, the numerical ratings received from the recommendation engine 116 for a given television show or other content can be boosted by the selected boost value (B) in exchange for monetary or other consideration, in such a manner as to be substantially imperceptible to most viewers or users of the system. Similarly, system operators could collect fees for assigning, to a particular show, an ordinal boost or a premium, sponsored recommendation.

The monetary or other consideration collected can be augmented or maximized through the process of auctioning premium, sponsored recommendation positions in the list, or by collecting greater consideration for providing higher values of ordinal or numerical boost. Prices paid for such positions or boost could be linked to any number of variables, including temporal duration, time of year, magnitude, perceived desirability and the like. Since television networks, other content providers and advertisers will wish to enhance EPG-user viewership for particular shows or entire lineups, it is expected that demand, and thus, prices, for premium, sponsored recommendations and numerical or ordinal boost can be driven higher, to the benefit of system operators. In turn, networks or other content providers with secured sponsored recommendations for particular shows could obtain higher prices for advertising affiliated with such shows.

Given the limitations of on-screen EPG advertising revenue discussed above in the Background of the Invention, the present invention offers cable television or other system operators a significant vehicle to enhance their revenue, by boosting the ratings or rankings of shows in exchange for monetary consideration. In addition, given the demonstrable relationship between EPG ratings and viewership, the present invention provides methods and systems that enable operators of television broadcasting or other content distribution systems to effectively alter the viewing patterns of viewers or subscribers. It also gives content providers a way to enhance viewership for particular shows or complete lineups. Cable television or other system operators can utilize the invention to direct viewership traffic to content carried on pay-per-view or other premium or enhanced-payment channels, thereby providing a form of internal traffic management. The invention accomplishes these objectives by enabling selective increases or decreases in the ratings or recommendations assigned to a television show or other content within an EPG system, in accordance with the desire of the system operator, content provider or advertiser to increase or decrease viewership for the show in question.

Having described the illustrated embodiments of the present invention, it will be apparent that modifications can be made without departing from the spirit and scope of the invention, as defined by the appended claims.

We claim:

1. A method of modifying viewership traffic, comprising:
    configuring a traffic process within an electronic programming guide (EPG) in a content distribution system, the traffic process operable by a system operator to modify a first rating of a first content in response to receipt of a first monetary consideration from a first sponsor;
    within the traffic process, receiving the first rating for the first content to be viewed by a human viewer;
    within the traffic process, applying to the received first rating a first boost transform to generate a modified first rating; and displaying, to the human viewer, at least one recommendation display entry having a characteristic controlled by the modified first rating, the characteristic tending to encourage more viewership traffic to the first program.

2. The method of claim 1, further comprising:
within the traffic process, receiving a second rating, for a second content;
within the traffic process, applying to the received second rating a second boost transform to generate a modified second rating; and
displaying, to a human viewer, at least one recommendation display entry having a characteristic controlled by the modified second rating;
wherein the applying of the second boost transform is enabled by the system operator in response to receipt of a second monetary consideration from a second sponsor.

3. The method of claim 2, wherein the at least one recommendation display entry is a rank-ordered list of a plurality of recommendations of a plurality of content.

4. The method of claim 3, wherein the first boost transform multiplies the received first rating by the first boost coefficient to generate the modified first rating and further wherein the second boost transform multiplies the received second rating by the second boost coefficient to generate the modified second rating.

5. The method of claim 4, wherein the first and second boost coefficients are selected so that the effect of applying the first and second transforms is substantially imperceptible to the viewers.

6. The method of claim 4, wherein applying the first and second boost transforms is enabled for a selected period of time.

7. The method of claim 4, further comprising:
receiving a plurality of bids in exchange for an offer of enabling the applying of the first and second boost transforms.

8. The method of claim 5, wherein the first and second boost coefficients are selected at least in part on the basis of the quantum of the first and second monetary considerations received.

9. The method of claim 5, wherein the first and second boost coefficients are selected to be approximately within a range of about 0.5 to about 2.0.

10. The method of claim 6, wherein the selected period of time is determined at least in part on the basis of the quantum of the first and second monetary considerations received.

11. The method of claim 1, wherein the traffic process is operable by the system operator to apply a third boost transform to at least a portion of the received ratings for a plurality of content provided on a plurality of selected channels within a set of channels affiliated with a given content provider.

12. The method of claim 11, wherein the selected channels are selected from the group consisting of: a plurality of premium channels, a plurality of pay-per-view channels, or a plurality of other enhanced payment channels within the set of channels affiliated with the given content provider.

13. A method of modifying viewership traffic, comprising:
receiving a rank-ordered list of content to be viewed in a content distribution system that includes an electronic programming guide (EPG);
designating, in the rank-ordered list, at least one premium position;
applying to the rank-ordered list a transform operable to generate a modified list by assigning a selected content to the premium position; and
displaying, to a human viewer, the modified list with the selected content assigned to the premium position, the premium position tending to encourage more viewership traffic to the selected content;
wherein the applying of the transform is enabled by a system operator in response to receipt of a monetary consideration from a sponsor of the selected content.

14. The method of claim 13, wherein a plurality of selected content is assigned to a plurality of premium positions at least in part on the basis of a quantum of the monetary consideration received in exchange for assignment to each premium position.

15. The method of claim 14, further comprising:
receiving a plurality of bids in exchange for an offer of assigning the selected content to each premium position.

16. The method of claim 13, wherein the assignment of the selected content to each premium position is enabled for a selected period of time.

17. The method of claim 16, wherein the selected period of time is determined at least in part on the basis of the quantum of the monetary consideration received.

18. The method of claim 13, wherein the selected content is provided on a plurality selected channels within a set of channels affiliated with a given content provider.

19. The method of claim 18, wherein the selected channels are selected from the group consisting of: a plurality of premium channels, a plurality of pay-per-view channels, or a plurality of other enhanced payment channels within the set of channels affiliated with the given content provider.

20. A method of modifying viewership traffic, comprising:
receiving a rank-ordered list of recommended content to be viewed in a content distribution system including an electronic programming guide (EPG);
applying to the rank-ordered list a transform operable to ordinally advance, within the list, a selected content, thereby to generate a modified list, ordinal advance tending to encourage more viewership traffic to the selected content; and
displaying the modified list to a human viewer;
wherein the applying of the transform is enabled by a system operator in response to receipt of a monetary consideration from a sponsor of the selected content.

21. The method of claim 20, wherein applying the transform is enabled for a selected period of time.

22. The method of claim 21, wherein the selected period of time is determined at least in part on the basis of the quantum of the monetary consideration received.

23. The method of claim 20, wherein the selected content is provided on a plurality of selected channels within a set of channels affiliated with a given content provider.

24. The method of claim 23, wherein the selected channels are selected from the group consisting of: a plurality of premium channels, a plurality of pay-per-view channels, or a plurality of other enhanced payment channels within the set of channels affiliated with the given content provider.

25. A method of modifying viewership traffic, comprising:
configuring a traffic process to be operable to receiving a plurality of ratings from a recommendation process in an electronic programming guide (EPG);
in the traffic process, receiving from the recommendation process a first rating, for a first content;
in the traffic process, applying to the received first rating a first boost transform to generate a modified first rating, by a system operator in response to receipt of a monetary consideration from a sponsor of the first content; and
displaying to a human viewer, at least one recommendation display entry having a characteristic controlled by the modified first rating, the characteristic tending to encourage more viewership traffic to the first content.

26. The method of claim 25, further comprising:
into traffic process, receiving from the recommendation process a second rating, for a second content;
in the traffic process, applying to the received second rating a second boost transform to generate a modified second rating; and
displaying, to the human viewer, at least one recommendation display entry having a characteristic controlled by the modified second rating.

27. The method of claim 26, wherein the at least one recommendation display entry is a rank-ordered list of a plurality of recommendations of a plurality of content.

28. The method of claim 27, wherein the first boost transform multiplies the received first rating by a first boost coefficient to generate the modified first rating, and further wherein the second boost transform multiples the received second rating by a second boost coefficient to generate the modified second rating.

29. The method of claim 28, wherein the first and second boost coefficients are selected so that the effect of applying the first and second transforms is substantially imperceptible to the viewers.

30. The method of claim 28, wherein the first and second boost coefficients are selected to be approximately within a range of about 0.5 to about 2.0.

31. A method of modifying viewership traffic, comprising:
receiving a rank-ordered list of content from an electronic programming guide (EPG);
designating, in the rank-ordered list, at least one premium position;
applying to the rank-ordered list a transform operable to generate a modified list by assigning, to the premium position, a selected content, the premium position tending to encourage more viewership traffic to the selected content; and
displaying, to a human viewer, the modified list with the selected content assigned to the premium position;
wherein the applying of the transform is performed by a system operator in response to receipt of a monetary consideration from a sponsor of the selected content.

32. A method of modifying viewership traffic, comprising:
receiving a rank-ordered list of recommended-television shows from an electronic programming guide (EPG);
applying to the rank-ordered list a transform operable to ordinally advance, with the list, a selected television show, thereby to generate a modified list, the ordinal advance tending to encourage more viewership traffic to the selected television show; and
displaying the modified list to a human viewer;
wherein the applying of the transform is performed by a system operator in response to receipt of a monetary consideration from a sponsor of the selected television show.

33. An electronic programming guide (EPG) apparatus, comprising:
a recommendation means for generating at least a first rating, for a first content to be viewed;
a transform means, in communication with the recommendation means, for applying to the first rating a first boost transform, to generate a modified first rating; and
a display means, in communication with the transform means, for displaying, to a human viewer, at least one recommendation display entry having a characteristic controlled by the modified first rating;
wherein the applying of the transform is performed by a system operator in response to receipt of monetary consideration from a sponsor of the first content.

34. The EPG apparatus of claim 33, wherein:
the recommendation means is operable to generate a second rating, for a second content;
the transform means is operable to apply to the second rating a second boost transform to generate a modified second rating; and
the display means is operable to display, to the human viewer, at least one recommendation display entry having a characteristic controlled by the modified second rating.

35. The EPG apparatus of claim 34, wherein the at least one recommendation display entry is a rank-ordered list of a plurality of recommendations of a plurality of content.

36. The EPG apparatus of claim 35, wherein the first boost transforms multiples the received first rating by a first boost coefficient to generate the modified first rating and further wherein the second boost transform multiples the received second rating by a second boost coefficient to generate the modified second rating.

37. The EPG apparatus of claim 36, wherein the first and second boost coefficients are selected to be approximately within a range of about 0.5 to about 2.0.

38. The EPG apparatus of claim 35, wherein the first and second boost coefficients are selected so that the effect of applying the first and second transforms is substantially imperceptible to the viewer.

39. The EPG apparatus of claim 33, wherein the transform means is operable to apply the transform in response to receipt of the monetary consideration.

40. An electronic programming guide (EPG) apparatus, comprising:
a means for receiving a rank-ordered list of a plurality of content to be viewed;
a means for designating, in the rank-ordered list, at least one premium position;
a transform means for applying to the rank-ordered list a transform operable to generate a modified list by assigning, to the premium position, the first content, the premium position tending to encourage more viewership traffic to the first content; and
a display means, in communication with the transform means, for displaying, to a human viewer, the modified list with the first content assigned to the premium position;
wherein applying the transform is performed by a system operator in response to receipt of a monetary consideration from a sponsor of the first content.

41. An electronic programming guide (EPG) apparatus, comprising:
a means for receiving a rank-ordered list of content to be viewed;
a transform means for applying to the rank-ordered list a transform operable to ordinally advance, within the list, a first content, thereby to generate a modified list the ordinal advance tending to encourage more viewership traffic to the first content; and
a display means, in communication with the transform means, for displaying the modified list to a human viewer;
wherein applying the transform is performed by a system operator in response to receipt of a monetary consideration.

* * * * *

UNITED STATES PATENT AND TRADEMARK OFFICE
CERTIFICATE OF CORRECTION

PATENT NO. : 7,392,531 B2  Page 1 of 1
APPLICATION NO. : 10/204842
DATED : June 24, 2008
INVENTOR(S) : Nathaniel Thurston et al.

It is certified that error appears in the above-identified patent and that said Letters Patent is hereby corrected as shown below:

Column 3, line 25, delete "an" and insert instead --a--.
Column 3, line 65, delete "1118," and insert --118,--.
Column 5, line 5, delete "Show I" and insert instead --Show 1--.
Column 7, line 29, in claim 5, delete "viewers." and insert instead --viewer.--.
Column 9, line 2, in claim 26, delete "into" and insert instead --in the--.
Column 9, line 16, in claim 28, delete "multiples" and insert instead --multiplies--.
Column 9, line 22, in claim 29, delete "viewers." and insert instead --viewer.--.
Column 10, line 16, in claim 36, delete "multiples" and insert instead --multiplies--.
Column 10, line 18, in claim 36, delete "multiples" and insert instead --multiplies--.
Column 10, line 57 (approx) in claim 41, after "list" insert --,--.

Signed and Sealed this

Ninth Day of September, 2008

JON W. DUDAS
*Director of the United States Patent and Trademark Office*